(12) United States Patent
Ridge

(10) Patent No.: US 6,931,159 B2
(45) Date of Patent: Aug. 16, 2005

(54) SIZE REDUCTION METHOD AND DEVICE FOR COMPRESSED IMAGES

(75) Inventor: Justin Ridge, Sachse, TX (US)

(73) Assignee: Nokia Corporation, Espoo (FI)

( * ) Notice: Subject to any disclaimer, the term of this patent is extended or adjusted under 35 U.S.C. 154(b) by 610 days.

(21) Appl. No.: 10/090,436

(22) Filed: Feb. 28, 2002

(65) Prior Publication Data

US 2003/0161542 A1 Aug. 28, 2003

(51) Int. Cl.⁷ ................................................. G06K 9/36
(52) U.S. Cl. ........................ 382/246; 382/246; 382/251; 382/250; 382/239; 375/243; 375/240.2
(58) Field of Search ......................... 382/245, 246, 382/225, 168, 250–251, 248, 239, 238; 348/405.1, 416.1, 414.1, 417.1–419.1, 422.1; 375/240.2, 240.3, 240.22, 243–245

(56) References Cited

U.S. PATENT DOCUMENTS

| | | | |
|---|---|---|---|
| 5,594,554 A | 1/1997 | Farkash et al. | 358/426 |
| 5,677,689 A | 10/1997 | Yovanof et al. | 341/50 |
| 5,699,458 A * | 12/1997 | Sprague | 382/250 |
| 6,233,359 B1 | 5/2001 | Ratnakar et al. | 382/250 |
| 6,243,761 B1 | 6/2001 | Mogul et al. | 709/246 |
| 6,330,369 B1 * | 12/2001 | Cornog et al. | 382/251 |
| 6,349,151 B1 * | 2/2002 | Jones et al. | 382/251 |
| 6,356,668 B1 * | 3/2002 | Honsinger et al. | 382/251 |

* cited by examiner

*Primary Examiner*—Kanjibhai Patel
*Assistant Examiner*—Ali Bayat
(74) *Attorney, Agent, or Firm*—Ware, Fressola, Van Der Sluys & Adolphson LLP

(57) ABSTRACT

A method and device for reducing a compressed image to a target size by reducing the quality of the image by a quality scaling factor. Image statistics inherent to the image are used to compute the size reduction as a function of the quality scaling factor. Using the relationship between the quality and the size of the image, an estimated quality scaling factor is obtained based on the target size in an iterative process until the size reduction corresponding to the estimated quality scaling factor is substantially equal to the target reduction.

19 Claims, 5 Drawing Sheets

SIZE REDUCTION METHOD AND DEVICE FOR COMPRESSED IMAGES

FIELD OF THE INVENTION

The present invention relates generally to the field of image processing and, more particularly, to reduction in the size of an image that is already compressed.

BACKGROUND OF THE INVENTION

It is generally known that image compression is effective in reducing the amount of image data for transmission or storage. In particular, with the introduction of scalable image coding formats like JPEG2000, it has become possible to send and receive only a fraction of the image file and still reconstruct a high-quality image at the receiving end. This is a desirable feature, because the size of a compressed digital image stored on one device must, in many cases, be further reduced in order for that image to be transmitted to or be displayed on a different device. However, many current digital imaging systems create and maintain content in the JPEG format, which uses a discrete cosine transform (DCT) block-based compression scheme. Unlike JPEG2000, if part of the image file corresponding to a JPEG image is omitted, the image becomes corrupted and the quality generally degrades to such an extent that the image is useless. Thus the JPEG format does not "scale" in terms of image file size.

To illustrate how the size of a previously compressed digital image stored on one device may need to be reduced in order for it to be stored or displayed on a different device, consider, for example, a large, high-quality digital image stored on a server. Such an image may exceed the memory limitations of a mobile device. In order for the mobile device to store and display the image, it would be necessary to reduce the size of the previously compressed image.

Continuing the foregoing example, if memory capacity were the only limitation, it would be possible to devise an algorithm to reduce the image size as it is received by the mobile device (prior to storage), rather than having the sender reduce the size prior to transmission. However, in reality, other limitations also apply. For example, some protocols may limit the maximum message size that can be transmitted to the mobile device, implying that the image size must be reduced prior to (not after) transmission. Additionally, reducing image size on the receiving end may waste significant bandwidth, resulting in cost inefficiencies.

If such a digital image transmission system were to operate on an automated basis, where it needed to reduce the size of many digital images per second without intervention of a human being, then in order for a system to process a specified number of images per second, the processing capability would be directly influenced by the efficiency of the processing operation. That is, if image size can be reduced in an efficient manner, less computational power would be required to meet the processing goal. Thus, there is a clear economic relationship between the time taken to reduce the size of an image and the cost of doing so. Such a relationship exists for multimedia messaging services, motivating the need for an efficient size-reduction method. In this specification, "size" means the number of bytes utilized by the compressed image. Thus, a "large" image is one that occupies many bytes in a storage space.

In the past, size reduction has been carried out using a number of approaches. These approaches generally possess one or more of the following characteristics:

a) the image is recompressed several times as size reduction is carried out in an iterative fashion;

b) the original (uncompressed) image data is assumed to be available when the image is resized;

c) the image, if already compressed, is fully decompressed prior to size reduction, and the resized image is recompressed for storage or transmission;

d) the image quality is unduly sacrificed in exchange for efficiency, resulting in a visually unacceptable product.

The iterative method is inefficient because it uses a trial-and-error approach that does not make use of the information contained in the image. Such a brute-force method is illustrated in FIG. 1. As shown in FIG. 1, the input image is decoded to obtain pixel values, and the quality needed to produce an image of the target size is visually judged. The image is re-compressed with the estimated quality. If the size of the re-compressed image is too large or too small as compared to the target size, then the quality is adjusted and the image is again re-compressed until a valid quality scaling factor is found. It should be noted that, when performing size reduction, each non-zero pixel value must be multiplied by the quality scaling factor (QSF) in a floating-point operation. Because of the computational complexity of the floating-point operation, a significant portion of the overall time to reduce the image size is spent in the final encoding phase.

Because JPEG is a variable-length scheme, the ultimate size of the compressed image depends not only upon the quality setting, but also upon the image content or the characteristics of the image itself. In other words, two different images with the same resolution and same quality setting may be compressed into different sizes. Thus, no clear relationship between image size and quality setting can be pre-defined: it varies according to the image content and may only be estimated statistically. In many cases such a statistical estimate is sufficiently accurate and may be the only option. For example, the remaining capacity on a storage card in a digital camera is estimated in such a fashion. The brute-force method does not take advantage of the availability of the information that can be extracted from an image.

A more "intelligent" approach is disclosed in Farkash et al. (U.S. Pat. No. 5,594,554, hereafter referred to as Farkash) and Yovanof et al. (U.S. Pat. No. 5,677,689, hereafter referred to as Yovanof), wherein certain characteristics of the image in question are used when determining the relationship between image quality and image size. In Yavanof, an activity metric reflecting the complexity of the input image is computed from the image data after the image is transformed using a Discrete Cosine Transform (DCT) and quantized using a predetermined Q-factor. Based on the activity metric, a new Q-factor is used to adjust the quantization coefficients on the partially JPEG compressed image. In Farkash, the activity of an image is computed in a statistical first pass prior to the actual compression pass, and a scale factor for quantization is computed based on the activity. While the approaches that use the activity metric of the image as disclosed in Yavanof and Farkash are useful, they deal with the issue of estimating file size for encoding an original image. This means that the original image data is assumed to be available when the image is resized. However, original images in most cases are not available. JPEG is generally used as a "lossy" format, meaning that an image that is first encoded and then decoded will not be identical to the original, although the differences may not be visually discernible. Consequently, any method that relies on the original image may not be useful.

In order to effectively use bandwidth on the Internet, Mogul et al. (U.S. Pat. No. 6,243,761, hereafter referred to as Mogul) discloses a size reduction method, wherein the original image is not required. Mogul treats image size reduction as a small component of a much larger "content adaptation" system. Mogul suggests that the input image be fully decompressed and then re-compressed. This approach is inherently inefficient, because it unnecessarily duplicates all the steps that have been used to process the input image.

Ratnakar et al. (U.S. Pat. No. 6,243,761, hereafter referred to as Ratnakar) discloses a method of image size reduction, wherein statistics about a compressed image are gathered after the image is partially decompressed, and a threshold is used to reduce the size of the image to suit a bandwidth. In Ratnakar, the DCT coefficient values below a certain magnitude are removed (set to zero) but the other DCT coefficient values are not modified. When using such a threshold to discard certain coefficients, the resulting image usually lacks granularity. While the approach disclosed in Ratnakar results in the size target "being beaten" with reduced computational complexity, the quality of the image is unduly sacrificed. Furthermore, the size of the reduced image usually cannot be estimated before the resizing process is actually carried out.

TABLE I

| QSF | Image size reduced by |
|---|---|
| 1.00 | 0% |
| 0.50 | 14% |
| 0.49 | 47% |
| 0.25 | 52% |
| 0.24 | 64% |
| 0.13 | 80% |
| 0.00 | 100% |

Applying a threshold to coefficients, as disclosed in Ratnakar, involves selectively removing some DCT coefficients and leaving the remainder unmodified. An alternative is to scale each coefficient value by some constant, which can be called the quality scaling factor (QSF).

There is a certain relationship between how much an image is to be reduced in size and the required QSF for the statistical model of a "typical image". When a number of quality scaling factors are used on a plurality of different images to determine the reduction percentage, the relationship between the reduction percentage and QSF of a "typical image" can be found. Such a relationship is shown in Table I and FIG. 2. As shown, the behavior involves a number of discontinuity steps. Discontinuities are due to the operation being performed on a previously quantized image; in contrast, the same plot for an uncompressed image would involve a smooth curve (i.e., without the discontinuities). The difference, plus the fact that few images fit this "typical" curve exactly, implies that it is almost impossible to develop a sufficiently accurate lookup table and use it to determine a QSF. If one relies on such a behavior to determine a target size based on a selected QSF, the actual reduction is likely to differ by 5 to 10 percent from the predicted reduction. Likewise, when using a lookup table to determine a QSF from a target reduction, one is likely to produce an image of sub-optimal quality. This can be illustrated by the following example, where the target size reduction is 20 percent. A size reduction of 1–14 percent usually corresponds to a QSF of between 0.5 and 1.0. According to Table I, the required QSF must be smaller than 0.5 because 20 percent reduction is more reduction than 14 percent, which corresponds with QSF=0.5. However, because of the discontinuity around QSF=0.50, a QSF of marginally under 0.5 will result in a 50 percent reduction in the image size. The actual reduction of 50 percent is far greater than the target reduction of 20 percent. Accordingly, if our goal is to reduce an original image of 15 KB to fit a certain display of 12 KB, we end up having a 7.5 KB image. If the image did not conform to the "typical image" behavior, a QSF of 0.5 may in fact meet the target of 12 KB exactly, meaning that using the QSF based solely upon a lookup table would have reduced the size more than required, i.e. to 7.5 KB instead of 12 KB. As size is not proportional to perceptual quality, this image is likely to look much worse than necessary. Similarly, in order to reduce an original image of 20 KB to a reduced image of 10 KB, we need a target reduction of 50 percent. According to Table I, a QSF of approximately 0.3 should be selected. However, because of the margin of error (i.e., the difference between an actual image and a "typical image"), this may result in only a 40–45 percent reduction, and the size of the resulting image is between 11 KB and 12 KB. Thus, the actual size is larger than the target size. This presents a serious challenge. Not only must a new QSF be calculated, but the image must be re-compressed one or more times.

It is desirable to provide an efficient method of reducing the size of an image, wherein the image is previously compressed and the original image is not available, where the method utilizes information particular to the image being reduced to aid in the reduction process.

SUMMARY OF THE INVENTION

The present invention uses image statistics inherent to a compressed image to compute the quality scaling factor which would yield a desired size reduction, based on the relationship between the quality and size of the image. More specifically, the quality scaling factor is estimated from the effect a reduction in quality has upon image size.

Thus, according to the first aspect of the present invention, there is provided a method of reducing the size of an input image to a target size by using a quality scaling factor to reduce image quality, wherein the size reduction is effected by applying a quality scaling factor estimated from the image statistics inherent to the input image. The method comprises the steps of:

selecting a range of quality scaling factors based on the target size;

obtaining a range of reduction factors based on the selected range of quality scaling factors for determining a quality-size relationship;

computing an estimated quality scaling factor corresponding to the target size based on the quality-size relationship;

obtaining an estimated reduction factor based on the estimated quality scaling factor for providing a difference between the target size and the size reduction effected by the estimated reduction factor; and refining the range of the quality scaling factors for reducing the difference until the difference falls within a predetermined limit.

According to the second aspect of the present invention, there is provided a device for reducing the size of an input image to a target size by using a quality scaling factor to reduce image quality, wherein the size reduction is effected by a reduction factor estimated from image statistics inherent to the input image, and wherein a range of quality scaling factors is selected based on the target size for size reduction estimation. The device comprises:

a first computation means, responsive to the range of quality scaling factors, for providing a corresponding range of reduction factors based on the image statistics, said range of quality scaling factors and said corresponding range of reduction factors forming a quality-size relationship;

a second computation means, responsive to the quality-size relationship, for determining an estimated quality scaling factor corresponding to the target size, so as to allow the first computation means to compute an estimated reduction factor for providing a difference between the target size and the size reduction effected by the estimated reduction factor; and a third computation means, responsive to the difference, for refining the range of the quality scaling factors, thereby changing the range of reduction factors, the quality-size relationship, and the estimated reduction factor, wherein said refining is repeated until the difference falls within a predetermined limit.

According to the third aspect of the present invention, there is provided a method of modifying a quantization table for reducing the size of a compressed input image to an output image of a target size, wherein the input image is decoded into a partially decompressed image to provide quantized coefficients, which are quantized according to the quantization table, the quantized coefficients including zero and non-zero values. The method comprises the steps of:

determining an estimated scaling factor based on the target size;

scaling the quantization table based on the estimated scaling factor for providing a modified quantization table; and reducing the non-zero coefficients based on the estimated scaling factor for recompressing the partially decompressed image into the output image.

Advantageously, the estimated scaling factor is a constant floating-point value.

Advantageously, the estimated scaling factor which is utilized for estimating the size of the output image based on the estimated scaling factor is determined in advance of the recompression.

Preferably, the size reduction is related to quality of the output image, and the method further comprises the steps of:

selecting a range of quality scaling factors based on the target size; and obtaining a range of reduction factors based on the selected range of quality scaling factors and image statistics inherent to the input image for determining a quality-size relationship, so as to allow the estimated scaling factor to be determined based on the quality-size relationship.

Advantageously, the method further comprises the steps of:

obtaining an estimated size of the output image based on the estimated scaling factor for providing a difference between the target size and estimated size; and refining the range of quality scaling factors for reducing the difference until the difference falls within a predetermined limit.

The present invention will become apparent upon reading the description taken in conjunction with FIGS. 2 to 5.

BRIEF DESCRIPTION OF THE DRAWINGS

FIG. 3a is a table showing an example of Huffman codeword removal before scaling.

FIG. 3b is a table showing an example of Huffman codeword removal after scaling.

BEST MODE TO CARRY OUT THE INVENTION

Figure 1:
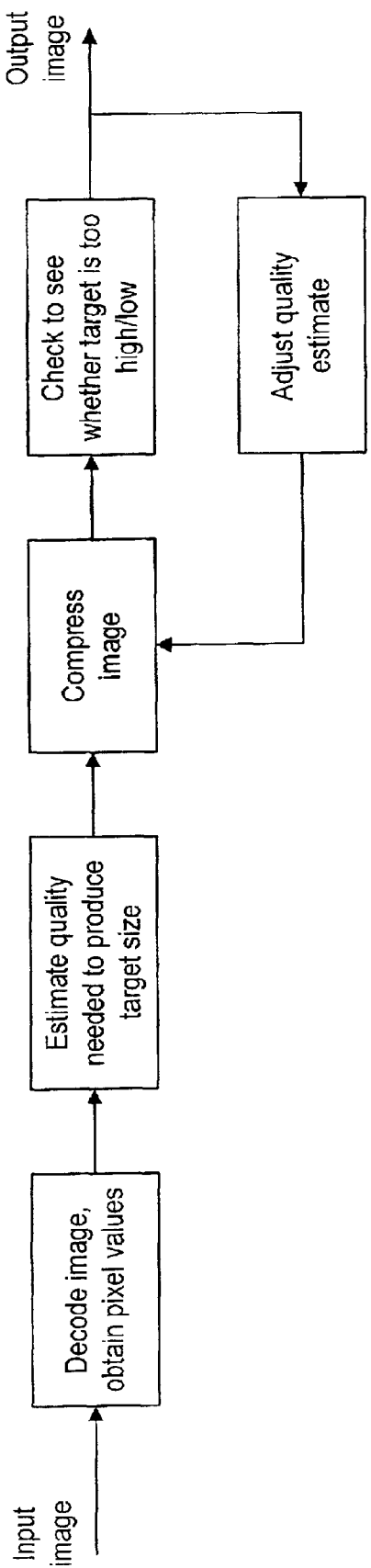
FIG. 1 is a block diagram showing a prior art method for image size reduction.
Figure 2:
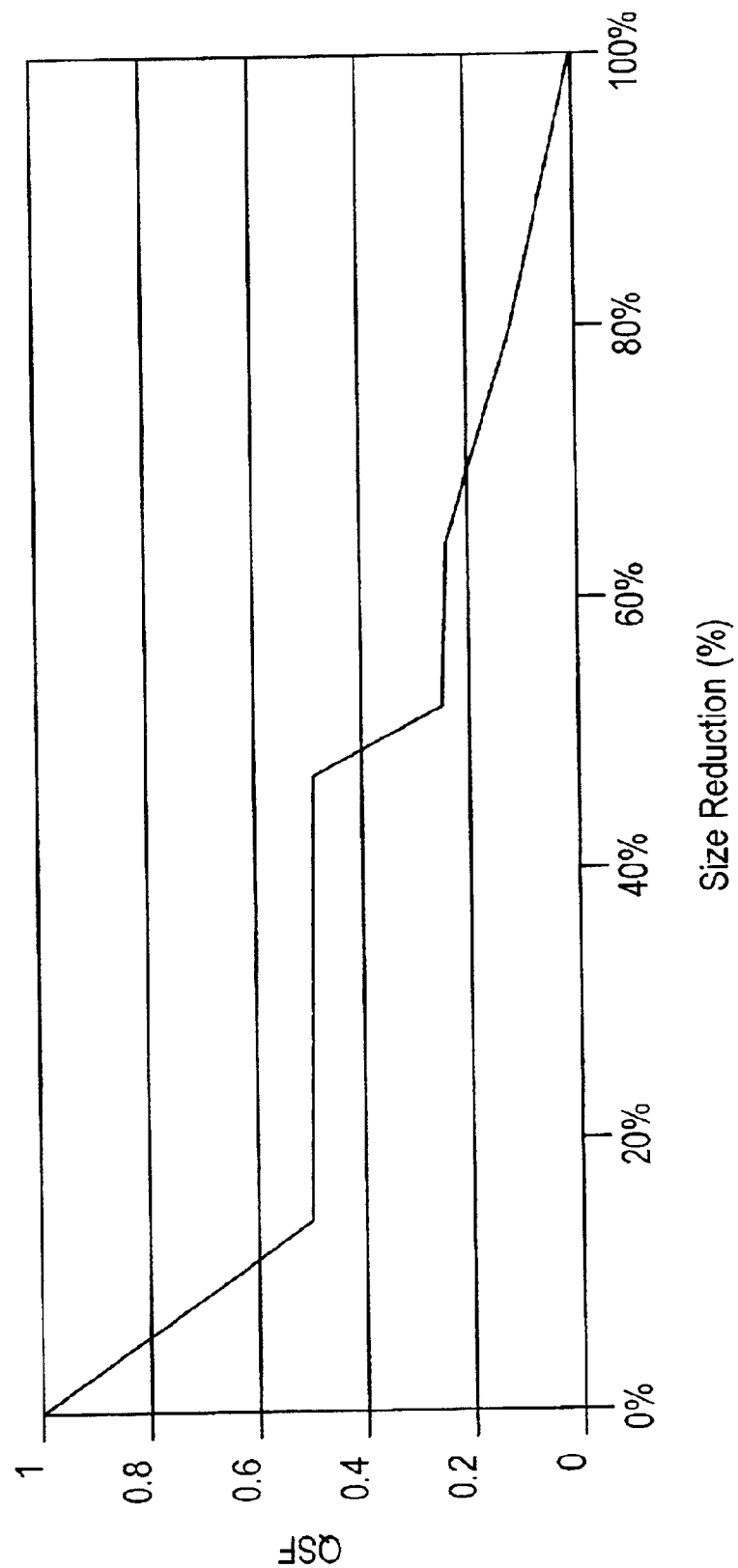
FIG. 2 is a plot showing the statistical relationship between quality scaling factor and image size reduction of a typical image.

As discussed in the background section above, by selecting a QSF in a lookup table such as Table I and applying it to each DCT coefficient in an image, one can reduce a compressed image to a smaller size. However, how much the image will actually be reduced using a given QSF is not usually predictable to any high degree of accuracy. While this lookup table method is acceptable if the target size is a "loose" target, where the reduction is allowed to fall within a certain range, it is not acceptable when a firm target is required. Nevertheless, the lookup table gives a valuable starting point in image size reduction. The present invention uses such a lookup table as an initial reference to find an estimated quality scaling factor in order to reach a target size reduction, $R_t$. $R_t$ is defined as the ratio of the number of bytes removed from an originally compressed image to the total number of bytes in the originally compressed image. In particular, the present invention is concerned with size reduction in an image which has been previously compressed and is stored in a DCT block-based compressed form, such as the form in a JPEG file. If the input image is a JPEG compressed image of a certain size, after the scaling, the resulting image is also a JPEG compressed image, the size of which is reduced by $R_t$ as compared to the original.

According to the preferred embodiment of the present invention, a previously-compressed JPEG image is partially decompressed so that the Huffman codewords in the compressed image in the transform domain can be read and image statistics can be gathered simultaneously. The statistics will be used to estimate a quality scaling factor $Q_e$. Subsequently, the quantization table is scaled by the estimated quality scaling factor and written into the new image bitstream along with the remainder of the JPEG header. Finally, each block (or 8×8 pixel segment) of the image is written to the output after scaling non-zero values by the QSF.

Part of the statistics available from the partially decompressed image are the histogram of the quantized coefficient values. With a given QSF, bit savings due to the decreases in coefficient magnitude can be computed as follows:

$$B_m = \sum_i \lceil \log_2 i \rceil C_i - \sum_i \lceil \log_2(i \cdot QSF) \rceil C_i = \sum_i (M_i - M_{i \cdot QSF}) C_i = \sum_i D_i C_i \qquad (1)$$

where $\lceil . \rceil$ denotes a ceiling function, and $C_i$ is the count of the number of times a coefficient with magnitude i occurs in the image (collectively the values $C_i$ form the histogram of the quantized image). For a given QSF value, the table of $D_i$ vs. i can be computed with little effort (between one and two additions for each non-zero magnitude depending on QSF, for example). After this operation, calculating the value of $B_m$ involves one integer multiplication and addition for each non-zero magnitude in the histogram.

In the JFIF format—a file format created by the Independent JPEG group for the transport of single JPEG-compressed images, each non-zero coefficient is prefixed by a Huffman codeword stating the number of bits required to represent the magnitude (for DC terms), or the zero run-length and number of bits (for AC terms). These Huffman codewords are not of equal size, and in general the size increases as the magnitude and run-length increase. Thus, if the number of magnitude bits decreases for a given input magnitude (i.e. if $D_i > 0$), then the length of the Huffman codeword preceding it may also decrease. If $M_x$ is the number of bits required to represent a value of magnitude x, and H(a) is the length of the Huffman codeword representing the value a, then the bit saving for the DC terms is $$B_{h_{dc}} = \sum_i H(M_i)C_i - \sum_i H(M_{i \cdot QSF})C_i = \qquad (2)$$

$$\sum_i \{H(M_i) - H(M_{i \cdot QSF})\}C_i = \sum_i Y_{i_{dc}} C_i,$$

The complexity in calculating the bit saving for the DC term is equal to the calculation for the magnitude savings, $B_m$. When implemented, it is possible to merge the two equations and eliminate one multiplication, i.e.

$$B_m + B_{h_{dc}} \sum_i D_i C_i + \sum_i Y_{i_{dc}} C_i = \sum_i (D_i + Y_{i_{dc}})C_i. \qquad (3)$$

For the AC terms, the calculation is slightly more complex because the Huffman codewords also incorporate run-length values for sequences of zeros as shown below:

$$B_{h_{ac}} \sum_j \sum_i H(16j + M_i)C_{ij} - \sum_j \sum_i H(16j + M_{i \cdot QSF})C_{ij} = \qquad (4)$$

$$\sum_j \sum_i Y_{ij_{ac}} C_{ij},$$

where $C_{ij}$ is the count of zero runs of length j terminated by magnitude i. This calculation requires sixteen times as many operations as the DC calculation, but since each inner loop only involves one integer multiplication and an addition, the entire operation is still computationally inexpensive.

Finally, the third source of bit savings is due to the elimination of some non-zero values altogether, i.e. changing non-zero values to zero. Naturally, the first non-zero values to start "becoming" zero values as QSF decreases will be those with a magnitude of one. Because magnitudes are rounded to the nearest integer, this means QSF must drop to at least 0.5 before this type of saving will come into play.

Extending the concept, QSF must drop to 0.25 before any values of two are scaled to zero, and it must drop to 0.166 before any values of three are scaled to zero. Other pairs could be listed, but reducing the value of QSF below approximately 0.125 is likely to yield a visually unacceptable image.

Unlike the previous calculations, which involved accounting for bits as the amount of information in the image decreases, changing non-zero values to zero values involves both adding and subtracting data. Where a value changes from non-zero to zero, the run-length terminating in that value will be eliminated, and the following Huffman codeword will be replaced by a Huffman codeword corresponding to a longer zero run-length (specifically, the sum of the two run-lengths plus one). This is illustrated in FIG. 3a and FIG. 3b, which show an example of Huffman codeword removal before and after, respectively, scaling with QSF= 0.4.

Figures 3A, 3B:
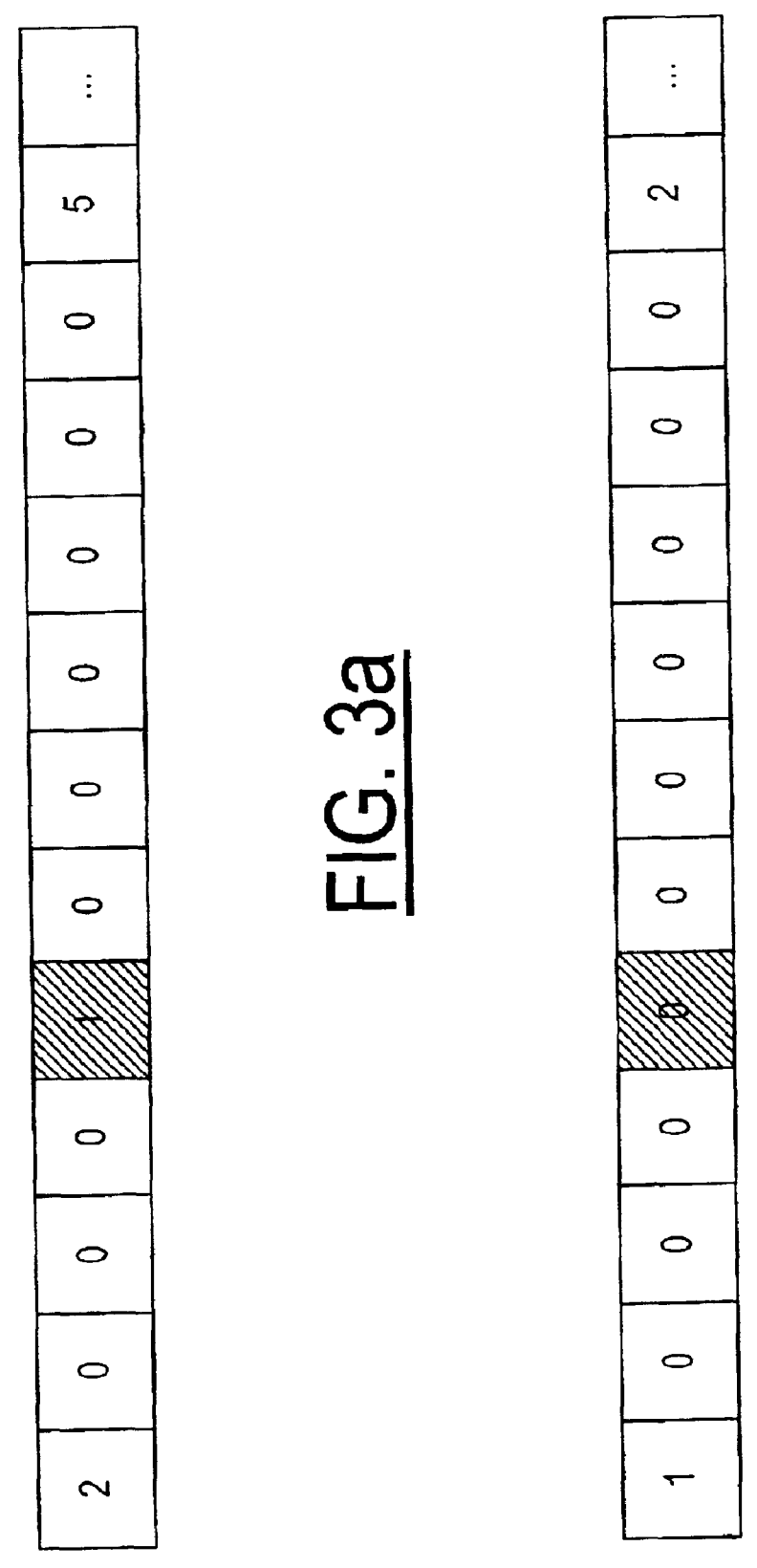

In the example, a run of three zeros is terminated by a value of one (the fifth box from the left in FIG. 3a. A Huffman code of length H(16×3+1)=H(49) would be used in the original image. This is followed by a run of six zeros terminated by a five. A Huffman code of length H(16×6+3)=H(99) would be used in the original image.

Now assume the QSF is 0.4, so that the scaled version is shown in FIG. 3b. After scaling, there is a single run of ten zeros followed by a two, because the value of one in FIG. 3a has changed from being non-zero to zero. The new Huffman codeword will have length H(16×10+2)=H(162). Thus the total bit-savings due to the Huffman removal will be H(49)+H(99)−H(162).

In total, the saving when values of magnitude one are converted to zero can be written as $$B_e = \sum_j H(16j+1)C_{ij} + \sum_j \sum_i H(16j + M_i)[F_{ij} - G_{ij}] = \qquad (5)$$

$$\sum_j \left\{ H(16j+1)C_{ij} + \sum_i H(16j + M_i)[F_{ij} - G_{ij}] \right\}$$

where $F_{ij}$ is the count of zero runs of length j terminated by magnitude i, which commence after a value of magnitude one in the input image; and $G_{ij}$ is the count of zero runs, which will replace the removed values. Note that although this calculation uses additional image statistics, i.e., it requires values for $F_{ij}$ and $G_{ij}$, it is still relatively simple to compute.

Some adjustment must also be made for extra "extension codes", which may be introduced into the JFIF bitstream as a result of increased zero run-lengths, but this is a trivial consideration. We are left with the ultimate result for total bit savings as follows:

$$B = B_m + B_{h_{dc}} + B_{h_{ac}} + B_e \qquad (6)$$

so that the expected size of the modified image will be equal to the previous size, less the bit savings.

With the total bit savings, as computed from Equation 6, the expected reduction can be computed. This demonstrates that there is a relationship among the quality scale factor, the statistics of the partially decompressed image and the reduction. The present invention makes use of this relationship to estimate a correct QSF given a target reduction rate $R_t$, which is based upon the target and original file sizes.

Figure 4:
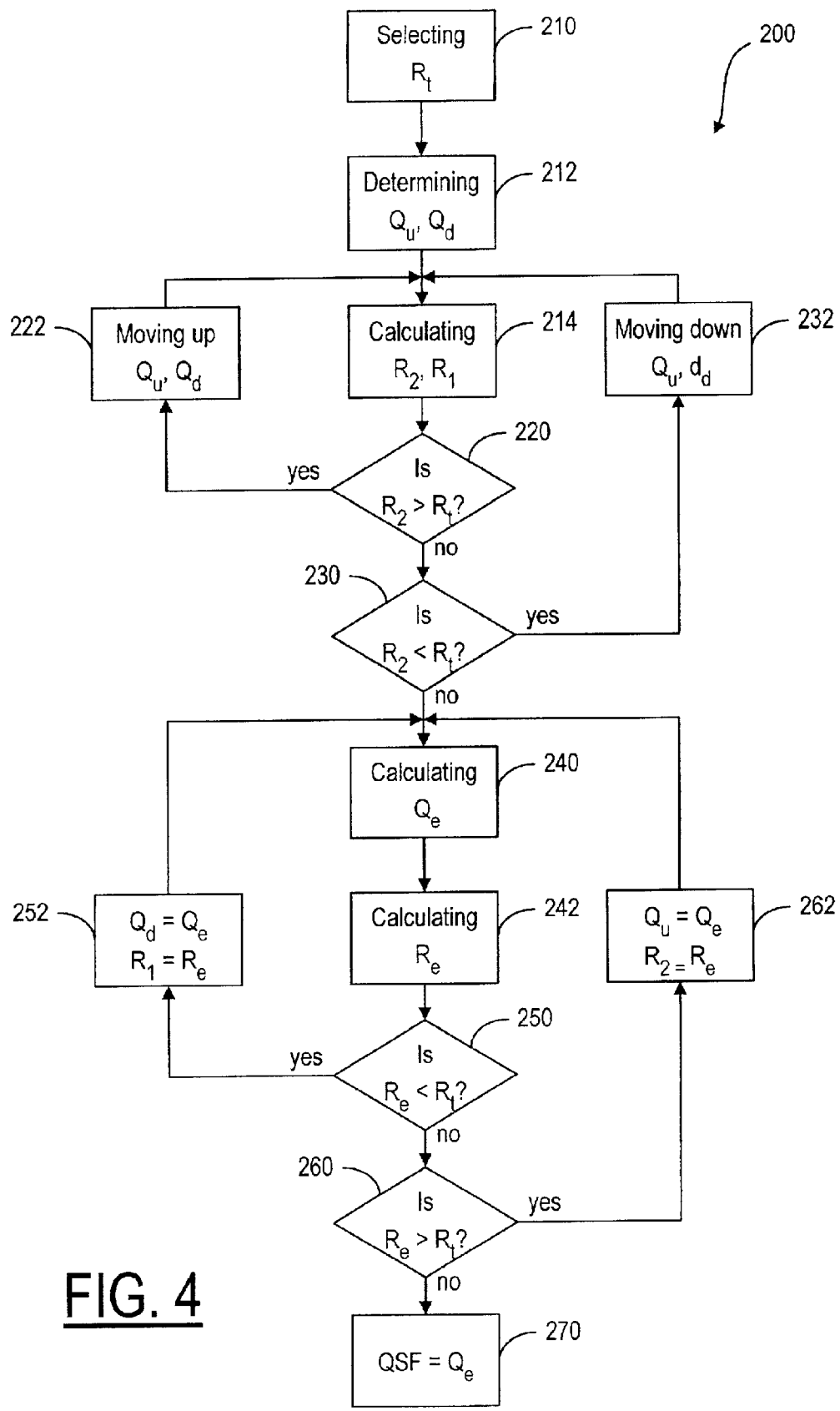
FIG. 4 is a flowchart showing the method of image size reduction, according to the present invention.

FIG. 4 is a flowchart 200 showing the method of computing the estimated QSF, $Q_e$, for quantization table scaling with a target reduction $R_t$. The starting point of the method is a lookup table, such as Table I, which gives the relationship between QSF and size reduction of a "typical image". Such a table can be divided into a plurality of "QSF bands". For example, the table can be divided into four "QSF bands" as follows: [0.0,0.125), [0.125,0.25), [0.25,0.5), [0.5,1.0]. Not coincidentally, the boundaries of these bands are points where non-zero values become zero, and thus Huffman codewords are removed. After the target reduction, $R_t$, of the image size is determined or selected at step 210, the corresponding quality scale factor $Q_t$ is determined from the table. For example, $Q_t$ is approximately 0.442 when $R_t$=48 percent. At step 212, the QSF band in which $Q_t$ falls is determined. This QSF band is bounded by an upper limit $Q_u$ and a lower limit $Q_d$. For example, $Q_t$=0.442 falls in the QSF band of [0.25,0.5), with $Q_u$=0.499 and $Q_d$=0.250. At step 214, the bit saving amounts, according to the quality scaling factors QSF=$Q_u$ and QSF=$Q_d$, are computed using Equation 6 in order to determine the corresponding size reduction percentages $R_2$ and $R_1$. Because $Q_u > Q_d$, we have $R_2 < R_1$. It is essential that $R_t$ falls is within the range bounded by $R_1$ and $R_2$, or $R_2 < R_t < R_1$. If this is the case, then the process continues at step 240.

If $R_2$, as computed from step 214, is greater than $R_t$, as determined at step 220, then the next higher QSF band is used for bit saving calculation. This means that the $Q_u$ and $Q_d$ are moved up one band at step 222, and the process loops back to step 214. For example, if $R_2 > R_t$ for $Q_t$=0.442, then the upper band [0.5, 1.0], which is bounded by $Q_u$=1.0 and $Q_d$=0.5, will be used at step 214 to calculate $R_2$ and $R_1$. This step is repeated, if necessary.

If $R_1$, as computed from step 214, is smaller than $R_t$, as determined at step 222, then the next lower QSF is used for bit saving calculation. This means that the $Q_u$ and $Q_d$ are moved down one band at step 232, and the process loops back to step 214. For example, if $R_1<R_t$ for $Q_t=0.442$, then the lower band [0.125, 0.25], which is bounded by $Q_u=0.249$ and $Q_d=0.125$, will be used at step 214 to calculate $R_2$ and $R_1$. This step is repeated, if necessary.

It should be noted that given a quality scaling factor, a size reduction can be computed using Equation 6. However, Equation 6 cannot be used to determine a quality scaling factor from a selected size reduction without iteration. For iteration purposes, it is assumed that there is a linear relationship between quality scaling factor and size reduction within the QSF band bounded by $Q_u$ and $Q_d$. Thus, at step 240, the estimated QSF, or $Q_e$, is computed as follows:

$$Q_e = Q_u - (R_t - R_2)/(R_1 - R_2) \times (Q_u - Q_d) \quad (7)$$

For example, for the QSF limits of 0.125 and 0.245, the computed reduction percentages are 50 percent ($R_1$) and 40 percent ($R_2$), respectively, then $$Q_e = 0.249 - (48-40)/(50-40) \times (0.249 - 0.125) = 0.1498$$

With QSF=$Q_e$, an estimated reduction percentage $R_e$ can be computed using Equation 6 at step 242. If $R_e$ is slightly greater than or equal to $R_t$, then $Q_e$ is used as the QSF for scaling at step 270. If $R_e>R_t$, $Q_d$ is set equal to $Q_e$ and $R_1$ is set equal to $R_e$ at step 252, and the process loops back to step 240 in order to calculate a new $Q_e$. Likewise, if $R_e<R_t$, $Q_u$ is set equal to $Q_e$ and $R_2$ is set equal to $R_e$ at step 262, and the process loops back to step 240 in order to calculate a new $Q_e$.

Figure 5:
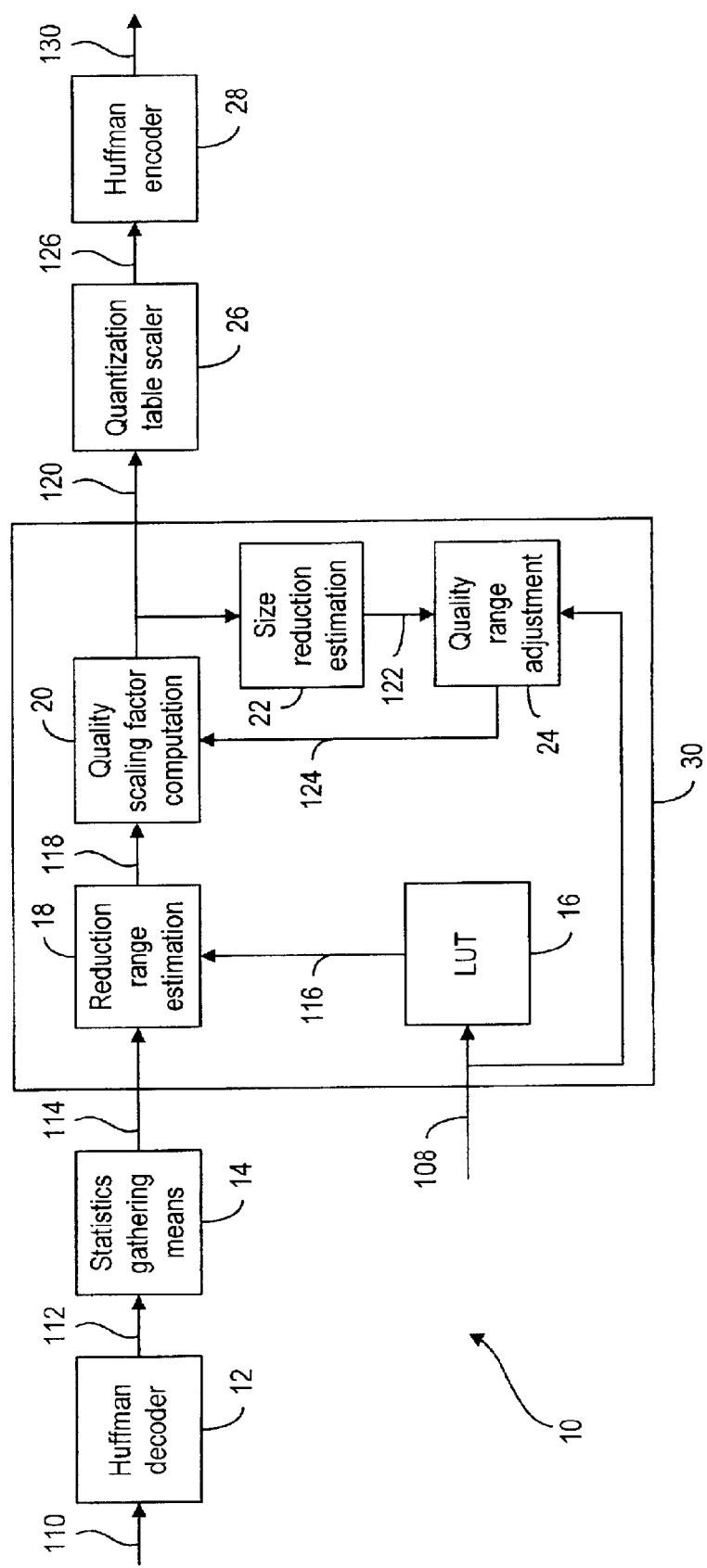
FIG. 5 is a block diagram showing a system for image size reduction, according to the present invention.

To facilitate the calculation of an estimated QSF for scaling, the present invention provides a quality adjustment 30, as shown in FIG. 5. FIG. 5 shows an image processing system 10, which receives an input image 110 and provides an output image 130. Usually the input image 110, as received, is a fully JPEG-compressed bitstream or JPEG file. Thus, a Huffman decoder 12 is used to decode the compressed image into a partially decompressed image 112 in the form of blocks of quantized DCT coefficients. However, if the input image is a partially decompressed image, the Huffman decoder 12 is not required. While the Huffman codewords are read, image statistics are gathered from the codewords by means 14. The statistics 114 are used by a QSF estimator module 30 to provide an estimated QSF 120 ($Q_e$), which is used to scale a quantization table as provided in the partially decompressed bitstream in order to produce an image of the target size. A scaling unit 26 is used to scale the quantization table using the estimated QSF 120 and a scaled quantization table is written, along with the remainder of the JPEG header, to a new image bitstream 126. Finally, a Huffman encoder 26 is used to re-encode the scaled coefficients into a Huffman bitstream 130 for output.

The quality adjustment module 30, according to the present invention, uses the statistics 114 to estimate a QSF for scaling in accordance with the target reduction, $R_t$. The target reduction $R_t$ is denoted by reference numeral 108. The present invention makes use of a lookup table 16, such as Table I, as an initial reference to provide a range within which a QSF is estimated. The range, or the QSF band, is bounded by limits $Q_u$ and $Q_d$, as denoted by reference numeral 116. With QSF=$Q_u$ and QSF=$Q_d$, a reduction range estimator 18 is used to compute the reduction limits $R_1$ and $R_2$ according to Equation 6. These reduction limits are denoted by reference numeral 118. If $R_2<R_t<R_1$, then a quality estimation unit 20 is used to find the estimated QSF 120. Otherwise, the QSF band is moved up or down, as discussed in conjunction with steps 220, 222, 230 and 232 in FIG. 4. By assuming that there is a linear relationship between quality scaling factor and size reduction within the QSF bounded by $Q_u$ and $Q_d$, an estimated QSF, or $Q_e$, is computed by means 20. Based on $Q_e$, a size reduction estimator 22 computes the estimated reduction $R_e$ using Equation 6. The estimated reduction is denoted by reference numeral 122. If $R_e$ is substantially equal to or slightly greater than $R_t$ (or the difference between $R_e$ and $R_t$ falls within a predetermined limit), then the estimated QSF is used for scaling. Otherwise, a range adjustment unit 24 is used to adjust the reduction limit and the QSF limit, as discussed in conjunction with steps 250, 252, 260 and 262 in FIG. 4. A new $Q_e$ is calculated, if necessary.

In practice, this method, as shown in FIG. 4, can generally identify a good (often ideal) QSF value within 2–4 iterations. Because the "bit-saving" method, according to the present invention, involves low computational complexity, repeating the calculation a small number of times has negligible impact upon overall system performance, whereas repeating the actual re-coding of the image imposes a severe penalty.

Given that the input image is already stored in compressed form, the Huffman codewords must be decoded prior to resizing. Maintaining image statistics is a simple addition to the decoding process. For each Huffman codeword, we increment the entry corresponding to the zero run-length and terminating magnitude in a two-dimensional array, corresponding to $C_{ij}$ in the previous calculations. If the terminating magnitude is small (e.g. one or two—values likely to be reduced to zero if the QSF is sufficiently low), the zero run-length is also accumulated until a "non-small" terminator is encountered. This last codeword is the one which would be replaced in the Huffman codeword removal scenario. Thus, we increment a separate two-dimensional histogram corresponding to the zero run-length and terminator (corresponding to $F_{ij}$) and also a separate histogram corresponding to the accumulated run-length and terminator ($G_{ij}$). Hence, the bulk of the statistical collection effort revolves around setting up histograms and incrementing counters as the image is partially decoded.

Finally, writing the resized image is a comparatively trivial matter. The quantization table from the original image is scaled by the estimated QSF, $Q_e$, and then each run-length terminating value is also scaled by $Q_e$ as it is written to the output.

A key difference between the present invention and previous solutions is that bit savings, according to the present invention, are calculated relative to a previously compressed image, which is not possible when compressing an original image.

In some scenarios, for example, when the table shown in Table I is not representative of the "typical image" that is likely to be encountered by an image processing system, it may be necessary to devise a new lookup table which differs from Table I. In other scenarios, the input images for an image processing system may vary to such an extent that it is meaningless to build a lookup table using a "typical image". In such cases, rather than using a plurality of "QSF bands", a single "QSF band" can be considered which spans the entire range [0,1). Thus, in such cases, processing would start with $Q_u=1$ and $Q_d=0$, and consequently $R_t$ is guaranteed to satisfy $R_2<R_t<R_1$, meaning that the algorithm can directly proceed to iteratively estimating $Q_e$ (step 240 in FIG. 4). Accordingly, the lookup table 16 and the reduction range estimation block 18 in FIG. 5 can be omitted.

Although the invention has been described with respect to a preferred embodiment thereof, it will be understood by those skilled in the art that the foregoing and various other changes, omissions and deviations in the form and detail thereof may be made without departing from the scope of this invention.

What is claimed is:

1. A method of reducing the size of an input image to a target size by using a quality scaling factor to reduce image quality, wherein the size reduction is effected by a reduction factor estimated from the quality scaling factor and image statistics inherent to the input image, said method comprising the steps of:

selecting a range of quality scaling factors based on the target size;

obtaining a range of reduction factors based on the selected range of quality scaling factors for determining a quality-size relationship;

computing an estimated quality scaling factor corresponding to the target size based on the quality-size relationship;

obtaining an estimated reduction factor based on the estimated quality scaling factor for providing a difference between the target size and the size reduction effected by the estimated reduction factor; and refining the range of the quality scaling factors for reducing the difference until the difference falls within a predetermined limit.

2. The method of claim 1, wherein a quality-size lookup table is used to select the range of quality scaling factors based on the target size.

3. The method of claim 2, wherein the lookup table is divided into a plurality of bands, and the range of quality scaling factors is selected from one of the bands.

4. The method of claim 1, wherein the image statistics include counts $C_i$ of the number of times a coefficient with magnitude i occurs in the input image.

5. The method of claim 4, wherein the range of reduction factors is computed based on a total bit savings B, where B is given by $$B = B_m + B_{h_{dc}} + B_{h_{ac}} + B_e$$

$$B_m = \sum_i \lceil \log_2 i \rceil C_i - \sum_i \lceil \log_2(i \cdot QSF) \rceil C_i = \sum_i (M_i - M_{i \cdot QSF}) C_i$$

$$= \sum_i D_i C_i$$

$$B_{h_{dc}} = \sum_i H(M_i) C_i - \sum_i H(M_{i \cdot QSF}) C_i = \sum_i \{H(M_i) - H(M_{i \cdot QSF})\} C_i$$

$$= \sum_i Y_{i_{dc}} C_i,$$

$$B_{h_{ac}} = \sum_j \sum_i H(16j + M_i) C_{ij} - \sum_j \sum_i H(16j + M_{i \cdot QSF}) C_{ij}$$

$$= \sum_j \sum_i Y_{ij_{ac}} C_{ij},$$

$$B_e = \sum_j H(16j + 1) C_{ij} + \sum_j \sum_i H(16j + M_i)[F_{ij} - G_{ij}]$$

$$= \sum_j \left\{ H(16j + 1) C_{ij} + \sum_i H(16j + M_i)[F_{ij} - G_{ij}] \right\}$$

wherein

QSF denotes the quality scaling factor;

$M_x$ is the number of bits required to represent a value of magnitude x;

H(a) is the length of the Huffman codeword representing the value a;

$C_{ij}$ is the count of zero runs of length j terminated by magnitude i;

$F_{ij}$ is the count of zero runs of length j terminated by magnitude i, which commence after a value of magnitude one in the input image; and $G_{ij}$ is the count of zero runs, which will replace the removed values.

6. A device for reducing the size of an input image to a target size by using a quality scaling factor to reduce image quality, wherein the size reduction is effected by a reduction factor estimated from image statistics inherent to the input image, and wherein a range of quality scaling factors is selected based on the target size for size reduction estimation, said device comprising:

a first computation means, responsive to the range of quality scaling factors, for providing a corresponding range of reduction factors based on the image statistics, said range of quality scaling factors and said corresponding range of reduction factors forming a quality-size relationship;

a second computation means, responsive to the quality-size relationship, for determining an estimated quality scaling factor corresponding to the target size, so as to allow the first computation means to compute an estimated reduction factor for providing a difference between the target size and the size reduction effected by the estimated reduction factor; and a third computation means, responsive to the difference, for refining the range of the quality scaling factors, thereby changing the range of reduction factors, the quality-size relationship, and the estimated reduction factor, wherein said refining is repeated until the difference falls within a predetermined limit.

7. The device of claim 6, wherein the range of quality scaling factors is selected based on a quality-size lookup table.

8. The device of claim 6, wherein the lookup table is divided into a plurality of bands, and the range of quality scaling factors is selected from one of the bands.

9. The device of claim 6, wherein the image statistics include counts $C_i$ of the number of times a coefficient with magnitude i occurs in the input image.

10. The device of claim 9, wherein the range of reduction factors is computed based on a total bit savings B, where B is given by $$B = B_m + B_{h_{dc}} + B_{h_{ac}} + B_e$$

$$B_m = \sum_i \lceil \log_2 i \rceil C_i - \sum_i \lceil \log_2(i \cdot QSF) \rceil C_i = \sum_i (M_i - M_{i \cdot QSF}) C_i$$

$$= \sum_i D_i C_i$$

$$B_{h_{dc}} = \sum_i H(M_i) C_i - \sum_i H(M_{i \cdot QSF}) C_i = \sum_i \{H(M_i) - H(M_{i \cdot QSF})\} C_i$$

$$= \sum_i Y_{i_{dc}} C_i,$$

$$B_{h_{ac}} = \sum_j \sum_i H(16j + M_i) C_{ij} - \sum_j \sum_i H(16j + M_{i \cdot QSF}) C_{ij}$$

$$= \sum_j \sum_i Y_{ij_{ac}} C_{ij},$$

$$B_e = \sum_j H(16j + 1) C_{ij} + \sum_j \sum_i H(16j + M_i)[F_{ij} - G_{ij}]$$

$$= \sum_j \left\{ H(16j + 1) C_{ij} + \sum_i H(16j + M_i)[F_{ij} - G_{ij}] \right\}$$

wherein

QSF denotes the quality scaling factor;

$M_x$ is the number of bits required to represent a value of magnitude x;

H(a) is the length of the Huffman codeword representing the value a;

$C_{ij}$ is the count of zero runs of length j terminated by magnitude i;

$F_{ij}$ is the count of zero runs of length j terminated by magnitude i, which commence after a value of magnitude one in the input image; and $G_{ij}$ is the count of zero runs, which will replace the removed values.

11. A method of modifying a quantization table for reducing the size of a compressed input image to an output image of a target size, wherein the input image is decoded into a partially decompressed image to provide quantized coefficients, which are quantized according to the quantization table, the quantized coefficients including zero and non-zero values, said method comprising the steps of:

determining a quality-size relationship based on the size reduction from the input image to the target size;

determining an estimated scaling factor based on the quality-size relationship and image statistics inherent to the input image;

scaling the quantization table by the estimated scaling factor for providing a modified quantization table; and scaling the non-zero coefficients based on the estimated scaling factor for recompressing the partially decompressed image into the output image.

12. The method of claim 11, wherein the estimated scaling factor is a constant floating-point value.

13. The method of claim 11, wherein the compressed input image is a JPEG image.

14. The method of claim 11, wherein the estimated scaling factor, which is utilized for estimating the size of the output image based on the estimated scaling factor, is determined in advance of the recompression.

15. A method of modifying a quantization table for reducing the size of a compressed input image to an output image of a target size, wherein the input image is decoded into a partially decompressed image to provide quantized coefficients, which are quantized according to the quantization table, the quantized coefficients including zero and non-zero values, said method comprising the steps of:

determining an estimated scaling factor based on the target size;

scaling the quantization table by the estimated scaling factor for providing a modified quantization table; and scaling the non-zero coefficients based on the estimated scaling factor for recompressing the partially decompressed image into the output image, wherein the size reduction is related to quality of the output image, said method further comprising the steps of:

selecting a range of quality scaling factors based on the target size; and obtaining a range of reduction factors based on the selected range of quality scaling factors and image statistics inherent to the input image for determining a quality-size relationship, so as to allow the estimated scaling factor to be determined based on the quality-size relationship;

obtaining an estimated size of the output image based on the estimated scaling factor for providing a difference between the target size and estimated size; and refining the range of quality scaling factors for reducing the difference until the difference falls within a predetermined limit.

16. The method of claim 15, wherein the image statistics include a histogram ($M_i$, $C_i$) of the quantized coefficients, and the estimated size is computed based on $$B_m = \sum_i \lceil \log_2 i \rceil C_i - \sum_i \lceil \log_2(i \cdot QSF) \rceil C_i = \sum_i (M_i - M_{i,QSF}) C_i = \sum_i D_i C_i$$

where $C_i$ is the count of the number of times a coefficient with magnitude i occurs in the input image, QSF is the estimated scaling factor, and $B_m$ a bit saving amount in the size reduction.

17. The method of claim 16, wherein the quantized coefficients include Huffman codewords (H), and the estimated size is also computed based on $$B_{h_{dc}} = \sum_i H(M_i) C_i - \sum_i H(M_{i,QSF}) C_i =$$
$$\sum_i \{H(M_i) - H(M_{i,QSF})\} C_i = \sum_i Y_{i_{dc}} C_i,$$

wherein $M_x$ is the number of bits required to represent a value of magnitude x, and H(a) is the length of the Huffman codeword representing the value a, and $B_{h_{dc}}$ is another bit saving amount in the size reduction.

18. The method of claim 17, wherein the image statistics include zero run-length values ($C_{ij}$) and the scaling of non-zero coefficients including the step of Huffman codewords removal, thereby changing the zero run-length values, and wherein the estimated size is further computed based on $$B_{h_{ac}} = \sum_j \sum_i H(16j + M_i) C_{ij} - \sum_j \sum_i H(16j + M_{i,QSF}) C_{ij} = \sum_j \sum_i Y_{ij_{ac}} C_{ij}$$

where $C_{ij}$ is the count of zero runs of length j terminated by magnitude i, and $B_{h_{ac}}$ is yet another bit saving amount in the size reduction.

19. The method of claim 15, further comprising the step of developing a histogram of the quantized coefficients as the input image is decoded into the partially decompressed image.

* * * * *

UNITED STATES PATENT AND TRADEMARK OFFICE
CERTIFICATE OF CORRECTION

PATENT NO. : 6,931,159 B2
DATED : August 16, 2005
INVENTOR(S) : Ridge

It is certified that error appears in the above-identified patent and that said Letters Patent is hereby corrected as shown below:

Column 14,
Line 45, "$M_{i,QSF}$" should be -- $M_{i,QSF}$ --.

Signed and Sealed this

Twenty-second Day of November, 2005

JON W. DUDAS
*Director of the United States Patent and Trademark Office*